United States Patent [19]

Holler et al.

[11] Patent Number: 4,486,031
[45] Date of Patent: Dec. 4, 1984

[54] CHILD RESTRAINT FOR PASSIVE RESTRAINT SYSTEM

[75] Inventors: J. Ronald Holler, Fraser; Francis E. Wojciechowski, Mt. Clemens, both of Mich.

[73] Assignee: General Motors Corporation, Detroit, Mich.

[21] Appl. No.: 494,404

[22] Filed: May 13, 1983

[51] Int. Cl.$^3$ .............................................. B60R 21/10
[52] U.S. Cl. ..................................... 280/802; 297/469
[58] Field of Search ............... 280/801, 802, 803, 807, 280/808; 297/468, 469, 474, 481, 483

[56] References Cited

U.S. PATENT DOCUMENTS

| | | | |
|---|---|---|---|
| 4,180,283 | 12/1979 | Ziv ........................................ | 297/469 |
| 4,220,354 | 9/1980 | Cataldo et al. ......................... | 297/469 |
| 4,236,755 | 12/1980 | Pollitt et al. ........................... | 297/468 |
| 4,243,266 | 1/1981 | Anderson ............................... | 297/468 |
| 4,256,329 | 3/1981 | Winnale ................................. | 297/483 |
| 4,319,769 | 3/1982 | Compeau et al. ..................... | 280/803 |

Primary Examiner—David M. Mitchell
Assistant Examiner—Ross Weaver
Attorney, Agent, or Firm—Charles E. Leahy

[57] ABSTRACT

A passive belt system includes a continuous-loop belt having a shoulder belt portion fixedly mounted on the upper rear corner of the door and a lap belt portion mounted on the lower rear corner of the door by a storage retractor. The storage retractor normally holds the belt at a fully extended length therefrom but winds the lap belt portion upon disconnect of a release buckle connecting the loop belt with an anchor belt retractably mounted on the inboard side of the vehicle seat. An auxiliary buckle arrangement for converting the system for restraint of a child occupant or child seat includes a pushbutton buckle slidable along the lap belt portion of the continuous-loop belt and a latch plate on the door adjacent the storage retractor which is releasably engageable by the buckle to normally store the buckle. An auxiliary child latch plate is mounted on the vehicle body outboard the seat and is engageable by the buckle to establish an auxiliary anchorage to effectively shorten the length of the lap belt portion for improved restraint of a child or child seat upon the occupant seat. A belt cinching bar within the buckle functions to uncinch the lap belt portion for normal passage therethrough when the buckle is engaged with the door mounted latch plate and functions to cinch the lap belt portion when the buckle is engaged with the auxiliary child restraint latch plate.

2 Claims, 5 Drawing Figures

CHILD RESTRAINT FOR PASSIVE RESTRAINT SYSTEM

The invention relates to a passive seat belt system and more particularly provides a passive seat belt system adapted for restraint of an occupant, a child, and a child seat.

BACKGROUND OF THE INVENTION

Prior patents such as Ziv U.S. Pat. No. 4,180,283 issued Dec. 25, 1979 and Winnale U.S. Pat. No. 4,256,329 issued Mar. 17, 1981 have recognized that the desirability of providing an auxiliary buckle arrangement for adapting a passive belt system to provide improved restraint for a child occupant or a child seat.

Co-pending patent application Ser. No. 494,403 filed May 13, 1983, by Thomas P. Duffield and James A. Winnale and owned by the Assignee of this patent application provides a three-point passive belt system wherein a continuous-loop belt has a shoulder belt portion fixedly mounted on the upper rear corner of the door and a lap belt portion mounted on the lower corner of the door by a storage retractor for winding and storing the loop belt upon disconnect of a release buckle connecting the loop belt with an anchor belt retractably mounted on the inboard side of the occupant seat.

The present invention relates to an auxiliary buckle for conversion of the aforedescribed passive seat belt system from adult occupant restraint to child occupant restraint.

SUMMARY OF THE INVENTION

A passive belt system includes a continuous-loop belt having a shoulder belt portion fixedly mounted on the upper rear corner of the door and a lap belt portion mounted on the lower rear corner of the door by a storage retractor. The storage retractor normally holds the belt at a fully extended length therefrom during use of the belt system in its normal occupant restraint mode of operation. The lap belt portion is wound upon the storage retractor to store the continuous-loop belt therein upon disconnect of a release buckle connecting the loop belt with an anchor belt retractably mounted on the inboard side of the vehicle seat. An auxiliary buckle arrangement for converting the adult occupant restraint system for the effective restraint of a child occupant or child seat includes a first buckle component such as a pushbutton buckle having a housing which is slidable along the lap belt portion of the continuous-loop belt. A second buckle component such as a latch plate is mounted on the door adjacent the storage retractor and is releasably engageable by the buckle to normally establish the buckle in line with the storage retractor to enable normal use of the belt system for passive occupant restraint and to enable passage of the lap belt portion through the buckle for storage by the storage retractor upon disconnect of the release buckle. A third buckle component such as an auxiliary latch plate similar to the door mounted latch plate is mounted on the vehicle body floor outboard the seat and is engageable by the buckle to establish an auxiliary anchorage of the outboard lap belt portion to effectively shorten the length of the lap belt portion for improved restraint of a child or child seat upon the occupant seat. A belt cinching bar is preferably carried within the housing of the buckle and functions to uncinch the belt for normal passage therethrough when the buckle is engaged with the door mounted latch plate and functions to cinch the lap belt when the buckle is engaged with the auxiliary child restraint latch plate.

The object, feature and advantage of the invention resides in the provision of a child restraint buckle component slidable along the lap belt portion and selectively engageable with either a latch plate mounted on the door to enable normal use and passage of the lap belt therethrough for storage on the door mounted storage retractor or selectively engageable with a body mounted auxiliary latch plate to effectively shorten the lap belt portion for restraint of a child occupant.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
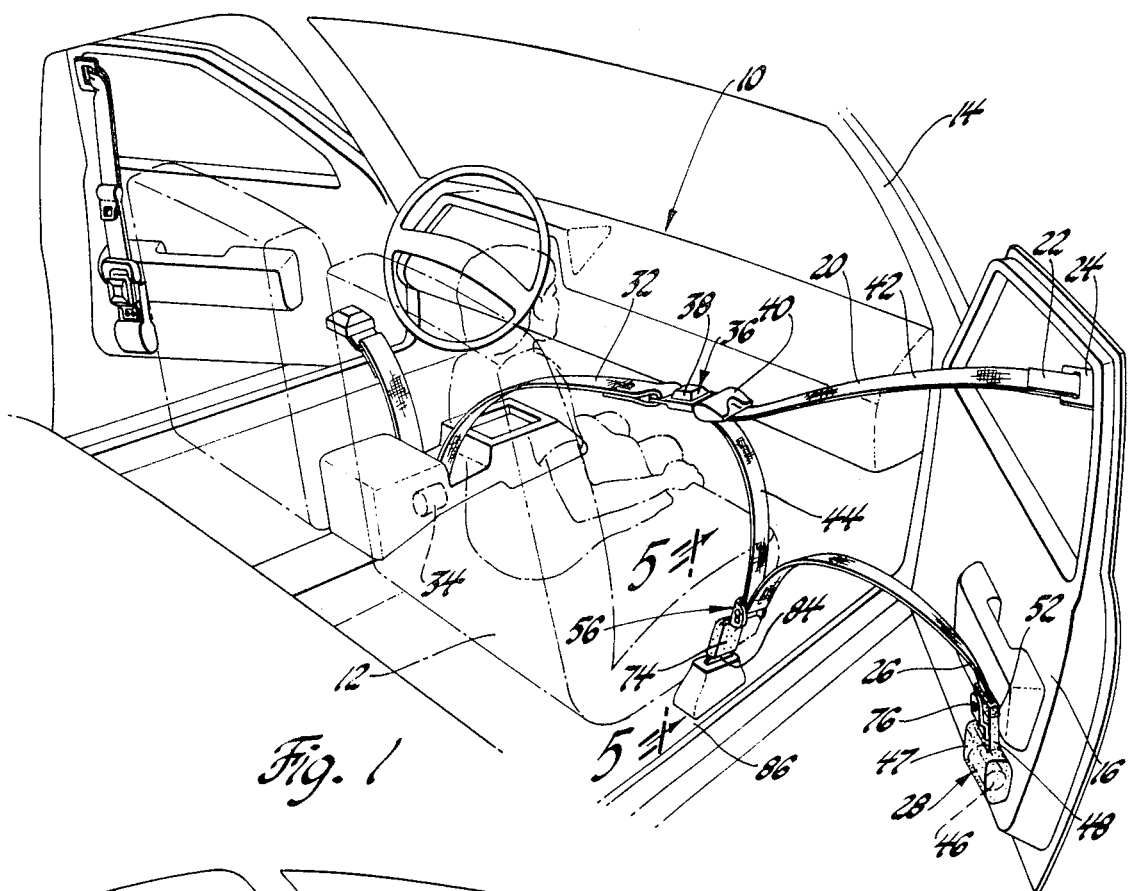
FIG. 1 is a perspective view of an occupant restraint system of this invention shown in the child restraint mode of operation.

Referring to FIG. 1 there is shown a vehicle body 10 having a passenger seat 12 located laterally adjacent the door opening 14. A door 16 is hingedly mounted on the vehicle body 10 for swinging movement between an open position shown in FIG. 1 and a closed position.

A three-point continuous-loop passive occupant restraint system for restraining an occupant in the seat 12 includes a continuous-loop belt 20 having an upper end 22 attached to the upper rear corner of the door 16 by an anchor plate 24 and a lower end 26 attached to the lower rear corner of the door. The lower end 26 is attached to the door by a belt storage retractor 28 to be more fully described hereinafter.

A control belt 32 has an inboard end which is retractably mounted by a retractor 34 suitably mounted on the vehicle 10 inboard the occupant seating position. The retractor 34 is preferably of the vehicle inertia sensitive type having a lock bar which is engaged with a belt reel by a pendulum or other inertia responsive member upon the occurrence of a predetermined level of vehicle deceleration.

A disconnect buckle assembly 36 couples the control belt 32 with the continuous-loop belt 20. The disconnect buckle assembly 36 includes a pushbutton buckle 38 which is attached to the outboard end of the control belt 32 and releasably mates with a latch plate 40 which is slidable along the continuous-loop belt 20 to divide the continuous-loop belt 20 into a shoulder belt portion 42 and a lap belt portion 44.

Figure 2:
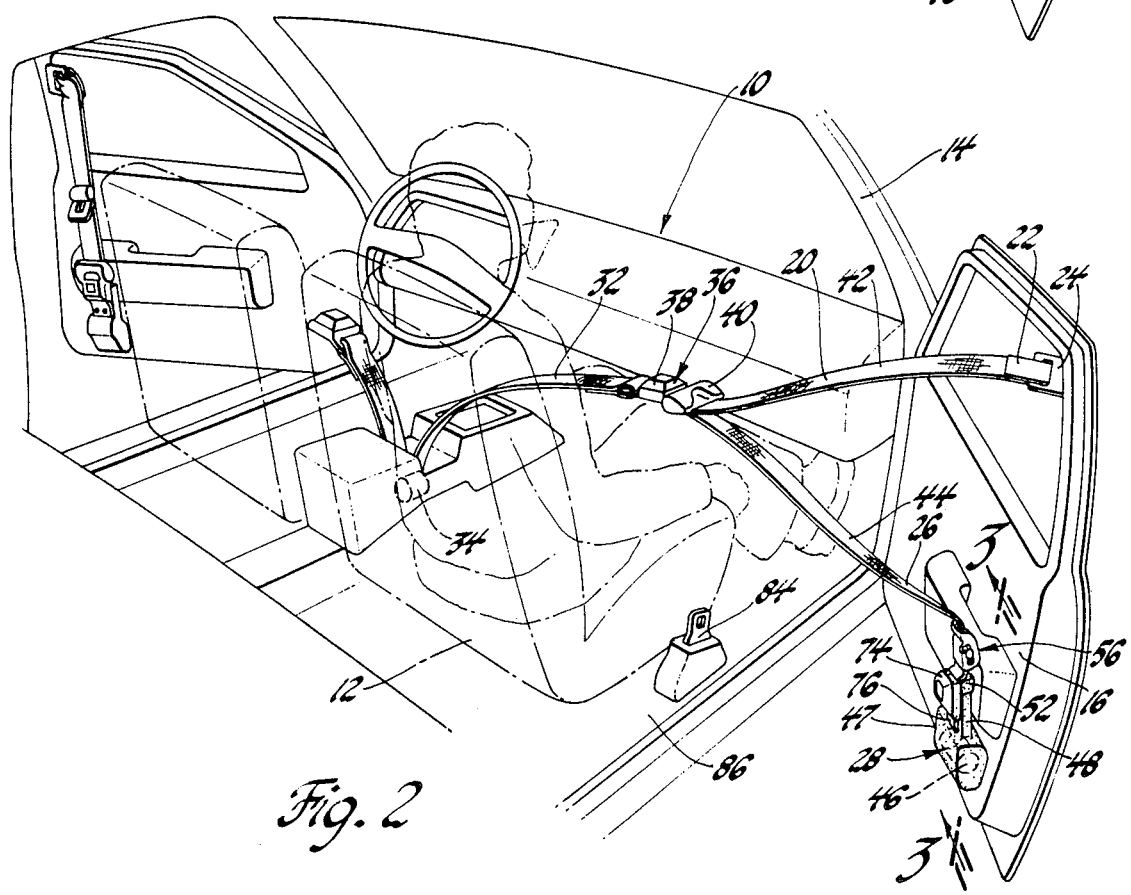
FIG. 2 is similar to FIG. 1 but showing the passive restraint system in the normal adult occupant restraint mode of operation.
Figure 3:
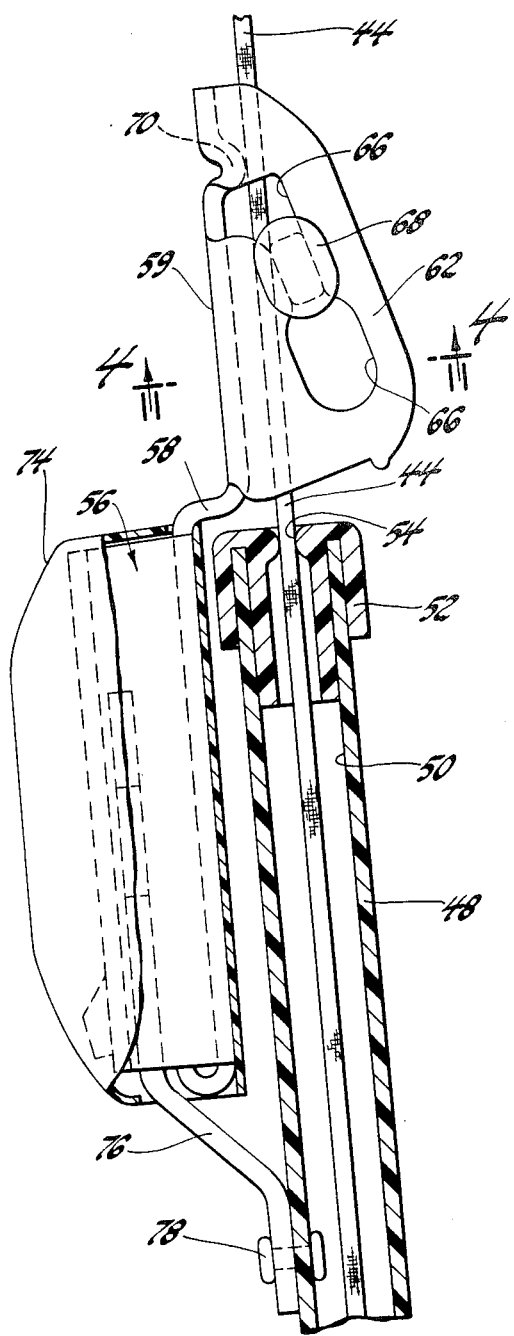
FIG. 3 is a sectional view taken in the direction of arrows 3—3 of FIG. 2.
Figure 5:
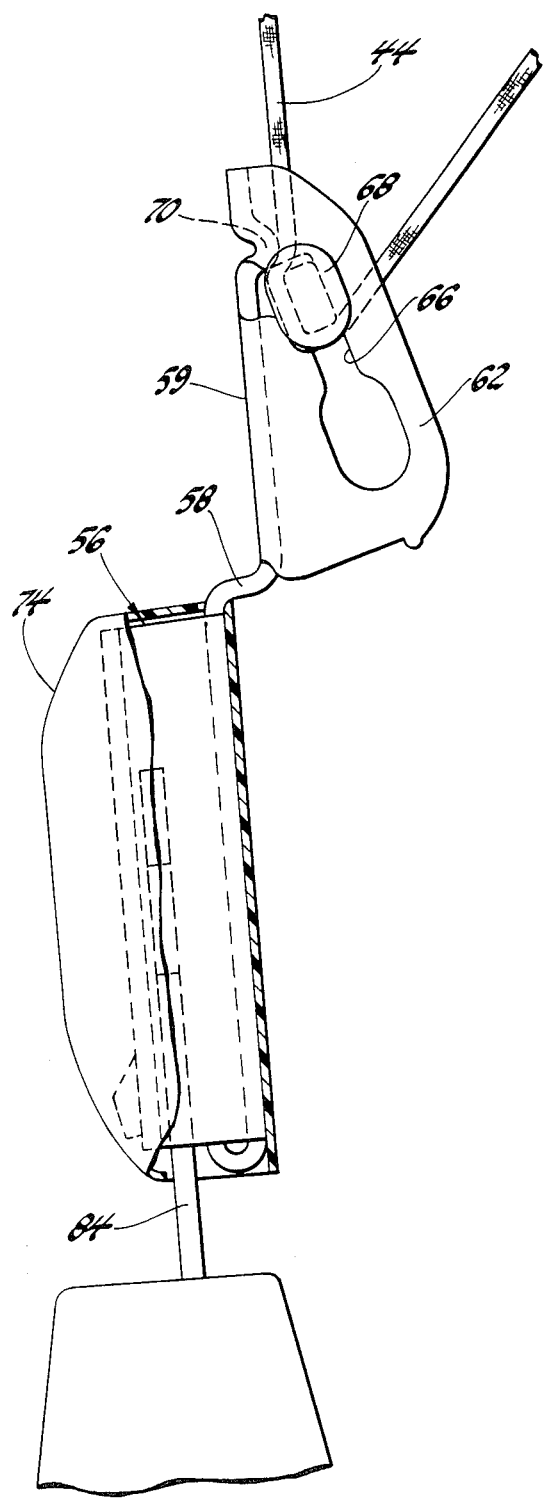
FIG. 5 is a sectional view taken in the direction of FIGS. 5—5 of FIG. 1.
Figure 4:
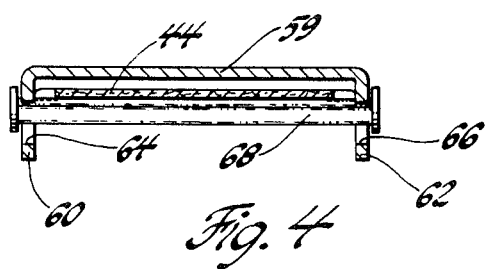
FIG. 4 is a sectional view taken in the direction of arrows 4—4 of FIG. 3.

Referring again to FIG. 1, it will be understood that the storage retractor 28 includes a spring wound belt storage reel 46 which is enclosed within a housing 47 having a molded plastic snorkel 48 as best seen in FIG. 3. The snorkel has a central passage 50 through which the lap belt portion 44 passes. A molded plastic cap 52 fits on the end of the snorkel 48 and has a belt exit opening 54. The storage retractor 28 has a latch associated with the storage reel 30 and which normally engages with ratchet teeth on the storage reel 46 to hold the storage reel 46 against belt winding rotation by the windup spring. Accordingly the lap belt portion 44 is normally held at its fully extended length shown in FIGS. 1 and 2. The latch is released from engagement with the storage reel 46 by a manual pushbutton or by a switch associated with the disconnect buckle assembly 36. Accordingly when the disconnect buckle 36 is released, the lap belt portion 44 is retracted through the snorkel 48 and stored upon the storage reel 46 so that the continuous-loop belt 20 is effectively stored along the door as shown at the left hand driver door of FIGS. 1 and 2. Reference may be had to co-pending patent application Ser. No. 494,403 for a further description of the construction and operation of the belt storage retractor 28.

A child restraint buckle assembly generally indicated at 56 and best shown in FIG. 3, includes a stamped metal housing 58 including a base 59 having laterally spaced apart upstanding arms 60 and 62. The upstanding arms have angular slots 64 and 66 which slidably mount a belt cinching bar 68. The lap belt portion 44 extends between the arms 60 and 62 and between the cinching bar 68 and a locking ridge 70 provided on the base 59. As seen in FIG. 3, the cinching bar 68 has a normal position spaced relatively away from the locking ridge 70 by the effect of gravity and/or a bias spring, not shown, so that the lap belt portion 44 is enabled to pass therebetween to enable retraction or extension of the lap belt portion relative the storage retractor 28. The buckle assembly 56 also includes a conventional pushbutton latch generally indicated at 74.

A second buckle component in the form of a latch plate 76 is attached to the snorkel 48 of the storage retractor 28 by a rivet 78. The buckle assembly 56 is normally engaged with the latch plate 76 so that the buckle assembly 56 is stored upon the door adjacent the storage retractor 28 and with the buckle assembly 56 aligned with the lap belt portion 44 to assure the free sliding passage of the lap belt portion 44 through the snorkel 48. Furthermore, the storage of the buckle assembly 56 retains the buckle assembly 56 at a predeterminedly fixed and consistent location which does not interfere with or affect the normal use of the passive occupant restraint system.

As best shown in FIG. 2, an auxiliary latch plate 84 is suitably attached on the vehicle body outboard the seat, for example, upon the sill 86.

Referring to FIG. 1, it is seen that the buckle assembly 56 is disconnected from the door mounted latch plate 76 and engaged with the body mounted latch plate 84. Accordingly, when the door is closed the control belt 32 draws the continuous-loop belt 20 inboard around the seated child and the lap belt portion 44 is drawn through the buckle assembly 56. Accordingly, the length of the lap belt portion 44 is shortened by several inches to better fit and restrain the child lower torso against forwarding excursion.

In the event that a child restraining load is imposed upon the lap belt portion 44, as for example during an occurrence of rapid vehicle deceleration, the lap belt 44 causes the cinching bar 68 to traverse the angled slots 64 and 66 and cinch the lap belt portion 44 between the cinching bar 68 and the locking ridge 70 of the base plate 59. Accordingly, the child restraint load imposed on the lap belt portion 44 is isolated from the storage retractor 28 so that the plastic snorkel 48 is not bent downwardly by the child restraint load.

Thus, it is seen that the invention provides a new and improved passive occupant restraint having an auxiliary buckle slidably mounted on the belt and detachable from a door mounted storage latch plate for engagement with a body mounted latch plate to effectively shorten and adapt the passive belt system for restraint of a child or a child seat.

While the invention has been disclosed primarily in terms of the specific body embodiment shown in the drawings, it is not intended to be limited thereto, but rather only to the extent set forth in the appended claims. For example, while the invention is disclosed herein as having the buckle slidable along the belt for engagement with latch plates mounted on the door and the body, it is within the scope of the invention to provide a latch plate slidable on the belt and engageable with the pushbutton buckle or other appropriate storage retainer mounted on the door and with a buckle mounted on the body.

The embodiments of the invention in which an exclusive property or privilege is claimed are defined as follows:

1. In combination with a vehicle seat belt system including a loop belt having a shoulder belt portion fixedly mounted on the door and a lap belt portion mounted on the door by a storage retractor for winding and storing the loop belt upon disconnect of a release buckle connecting the loop belt with a control belt retractably mounted on the inboard side of the seat, an auxiliary buckle for conversion of the belt system from adult occupant restraint to child occupant restraint comprising:

a first buckle component including a housing slidable along the lap belt portion;

a second buckle component mounted upon the door adjacent the storage retractor and releasably engageable by the first buckle component to normally establish the first buckle component in line with the storage retractor to enable normal use of the belt system for adult occupant restraint and to enable passage of the loop belt therethrough for storage by the storage retractor upon disconnect of the release buckle; and a third buckle component like the second buckle component and mounted upon the vehicle body outboard the seat and engageable by the first buckle component to establish an auxiliary child restraint anchorage of the outboard lap belt portion to shorten the length of the loop belt for restraint of a child upon the seat.

2. In combination with a vehicle seat belt system including a loop belt having a shoulder belt portion fixedly mounted on the door and a lap belt portion mounted on the door by a storage retractor for winding and storing the loop belt upon disconnect of a release buckle connecting the loop belt with a control belt retractably mounted on the inboard side of the seat, an auxiliary buckle for conversion of the belt system from adult occupant restraint to child occupant restraint comprising:

a first buckle component including a housing slidable along the lap belt portion;

a second buckle component mounted upon the door adjacent the storage retractor and releasably engageable by the first buckle component to normally store the first buckle component upon the door;

a third buckle component like the second buckle component and mounted upon the vehicle body outboard the seat and engageable by the first buckle component to establish an auxiliary child restraint anchorage of the outboard lap belt portion to shorten the length of the loop belt for restraint of a child upon the seat; and belt cinching means associated with the first buckle component and adapted to permit passage of the loop belt therethrough when the first buckle component is stored upon the door and to cinch the loop belt against passage through the first buckle component when the first buckle component is engaged with the third buckle component.

* * * * *